US012643714B2

(12) United States Patent
Clottin-Basini

(10) Patent No.: US 12,643,714 B2
(45) Date of Patent: Jun. 2, 2026

(54) RE-CLOSABLE FLEXIBLE CONTAINER FOR MIXING INGREDIENTS, KIT FOR BAKING MIX AND METHOD OF OPERATION THEREOF

(71) Applicant: The Baking Coach, Inc., Bellport, NY (US)

(72) Inventor: Lisa Clottin-Basini, Smithtown, NY (US)

(73) Assignee: THE BAKING COACH, INC., Bellport, NY (US)

( * ) Notice: Subject to any disclaimer, the term of this patent is extended or adjusted under 35 U.S.C. 154(b) by 749 days.

(21) Appl. No.: 17/987,716

(22) Filed: Nov. 15, 2022

(65) Prior Publication Data

US 2023/0339655 A1 Oct. 26, 2023

Related U.S. Application Data

(60) Provisional application No. 63/333,214, filed on Apr. 21, 2022.

(51) Int. Cl.

| | |
|---|---|
| ***B65D 33/06*** | (2006.01) |
| ***B01F 35/32*** | (2022.01) |
| ***B01F 35/513*** | (2022.01) |
| ***B65D 33/00*** | (2006.01) |
| ***B65D 33/25*** | (2006.01) |
| *B01F 101/08* | (2022.01) |

(52) U.S. Cl.

CPC .......... *B65D 33/06* (2013.01); *B01F 35/3202* (2022.01); *B01F 35/513* (2022.01); *B65D 33/004* (2013.01); *B65D 33/2541* (2013.01); *B01F 2101/08* (2022.01)

(58) Field of Classification Search

CPC .... B65D 33/06; B01F 35/3202; B01F 35/513; B01F 2101/08; B01F 31/55

See application file for complete search history.

(56) References Cited

U.S. PATENT DOCUMENTS

| | | | |
|---|---|---|---|
| 3,194,185 | A | 7/1965 | Giuseppina |
| 5,782,562 | A | 7/1998 | Anspacher |

(Continued)

OTHER PUBLICATIONS https://www.allrecipes.com/recipe/17481/simple-white-cake/ (Year: 2016).*

(Continued)

*Primary Examiner* — Marc C Howell

(74) *Attorney, Agent, or Firm* — Carter, DeLuca & Farrell LLP

(57) ABSTRACT

A flexible container for mixing dough may include a substrate including at least first and second surfaces situated between opposing ends and opposing edges; a re-closable closure coupled to the substrate and extending at least partially between the opposing edges; the substrate being folded at first, second and third folds and coupled to itself at the opposing edges so as to define a gusset situated between the first and third folds, and to define at least a portion of a cavity configured to receive ingredients for making the dough; and a support cavity at one or more of the first, second and third folds, the support cavity being configured to be grasped by a user. The support cavity may include at least one opening configured to be grasped by the user.

10 Claims, 12 Drawing Sheets

(56) References Cited

U.S. PATENT DOCUMENTS

| | | | | |
|---|---|---|---|---|
| 6,345,911 | B1 * | 2/2002 | Young | B65D 33/10 383/44 |
| 2006/0263494 | A1 | 11/2006 | Geng | |
| 2008/0020111 | A1 | 1/2008 | Park | |
| 2013/0277392 | A1 | 10/2013 | Dominguez | |
| 2017/0327288 | A1 | 11/2017 | Porchia | |
| 2018/0147549 | A1 * | 5/2018 | Temple | B01F 35/531 |
| 2021/0130064 | A1 | 5/2021 | Sasaki | |
| 2022/0240650 | A1 * | 8/2022 | Malaprade | A45D 44/005 |
| 2023/0310276 | A1 * | 10/2023 | Taneja | B01F 23/50 206/221 |

OTHER PUBLICATIONS https://instacakecards.com/product-category/buy_celebration/ (Year: 2021).*

International Search Report and Written Opinion issued in corresponding International Application No. PCT/US2023/037126, dated Feb. 16, 2024, pp. 1-9.

International Report on Patentability issued in corresponding International Application No. PCT/US2023/037126, dated Apr. 29, 2025, pp. 1-11.

* cited by examiner

RE-CLOSABLE FLEXIBLE CONTAINER FOR MIXING INGREDIENTS, KIT FOR BAKING MIX AND METHOD OF OPERATION THEREOF

CROSS REFERENCE TO RELATED APPLICATIONS

This application claims the benefit to U.S. Provisional Application Ser. No. 63/333,214 filed on Apr. 21, 2022, entitled Baking Mixes—Mixed Directly In the Bag, the entire contents of which is incorporated herein by reference in its entirety.

FIELD OF THE PRESENT SYSTEM

The present system relates to a non-rigid mixing container for making dough and more particularly, to a re-closeable mixing container for mixing ingredients to form a dough, such as a cookie dough, suitable for baked or unbaked goods, and a method of operation thereof.

BACKGROUND OF THE PRESENT SYSTEM

Typically to make dough, such as cookie dough, the dough is formed using ingredients which are mixed in a bowl using implements such as a mixer. The person making the dough (e.g., user) must select a bowl to fit the amount of dough expected to be made and must be skilled enough to properly measure the ingredients to be added to the bowl and be skilled in combining the ingredients to form the dough. Further, after making the dough, the bowl as well as the additional implements and/or preparation surfaces (e.g., tabletops, etc.), measuring implements, mixing implements, etc., must be thoroughly cleaned to avoid contamination before they can be used at a later time. This cleanup is undesirable, difficult, time consuming, and may waste resources such as water and time. In addition, ingredients expire when purchased in large portions, much of which typically remain unused after making a recipe. To overcome the aforementioned barriers and detriments as well as others, there is a need for a re-closable flexible container and system that overcomes the aforementioned detriments of the prior art systems.

SUMMARY OF THE PRESENT SYSTEM

The system(s), device(s), method(s), arrangements(s), interface(s), computer program(s), processes, etc., (hereinafter each of which will be referred to as system, unless the context indicates otherwise), described herein address problems in prior art systems. In accordance with embodiments of the present system, there is disclosed a flexible container for mixing dough. The flexible container may include: a substrate including at least first and second surfaces situated between opposing ends and opposing edges; a re-closable closure coupled to the substrate and extending at least partially between the opposing edges; the substrate being folded at first, second and third folds and coupled to itself at the opposing edges so as to define a gusset situated between the first and third folds, and to define at least a portion of a cavity configured to receive ingredients for making the dough; and a support cavity at one or more of the first, second and third folds, the support cavity being configured to be grasped by a user. The support cavity may include at least one opening configured to be grasped by the user. The support cavity may include a loop configured to be grasped by the user. The loop may be formed by coupling a support strap to the substrate. The support strap may extend across an opening to the support cavity. The loop may be formed by coupling together portions of the substrate at the first and third folds. The opposing ends of the substrate may be coupled to each other to seal the cavity. A weakened area may extend between the opposing edges. The weakened area may be configured to propagate separation of the substrate to open the cavity within.

In addition, embodiments of the present system may include a flexible container for mixing dough. The flexible container may include a substrate comprising at least first and second surfaces situated between opposing ends and opposing edges; a re-closable closure coupled to the substrate and extending at least partially between the opposing edges; the substrate being folded at first, second and third folds and coupled to itself at the opposing edges so as to define a gusset situated between the first and third folds, and at least a portion of a cavity configured to receive ingredients for making the dough; tabs situated on opposing sides of the gusset and being bonded to each other to seal at least a portion of the cavity; and a support cavity at the one or more first, second and third folds, the support cavity being configured to be grasped by a user. The support cavity may include at least one opening configured to be grasped by a user. The support cavity may include a loop configured to be grasped by a user. The loop may be formed by coupling a support strap to the substrate. The support strap may extend across an opening to the support cavity. The loop may be formed by coupling portions of the substrate at the first and third folds together.

In accordance with embodiments, the second surface may include a low adhesion surface coating configured to prevent adhesion of the dough. The re-closable closure may include an interference fit zip-type closure. The substrate may include a quick response code (QR code) printed thereon. The flexible container may be configured to be grasped by the support cavity. The cavity may be configured to enable mixing of ingredients to form a dough.

Further, embodiments of the present system may include a method of preparing a dough using a kit. The method may include an act of providing the kit including: a substrate including at least first and second surfaces situated between opposing ends and opposing edges, a re-closable closure coupled to the substrate and extending at least partially between the opposing edges, the substrate being folded at first, second and third folds and being coupled to itself at the opposing edges so as to define a gusset situated between the first and third folds, and to define a flexible container having at least a portion of a cavity configured to receive ingredients for making the dough, the cavity being filled with at least the ingredients and one or more accessory items, and having a support cavity at one or more of the first, second and third folds, the support cavity being configured to be grasped by a user. The method may further include opening the flexible container; removing the ingredients and the one or more accessory items; placing at least a first portion of the ingredients back into the flexible container along with at least one additional ingredient; closing the re-closable closure while removing a majority of air within the cavity; manually manipulating the flexible container to mix the portion of the ingredients and the at least one additional ingredient together to form first mixed ingredients; opening the re-closable closure; placing at least one of a second portion of the ingredients and at least a second additional ingredient into the flexible container along with the first mixed ingredients back into the flexible container; reclosing the re-closable closure while maintaining more air within the cavity then when the air was removed previously; manually manipulating the flexible container to mix the first mixed ingredients and the at least one of the second portion of the ingredients and at least the second additional ingredient together to form second mixed ingredients; reopening the re-closable closure; removing the second mixed ingredients for baking and/or consumption. The method may include acts of scanning a QR code on the flexible container; retrieving instructions relating to at least one of preparation and mixing the ingredients of the kit to form the dough based on the scanned QR code; and rendering the instructions on a rendering device.

BRIEF DESCRIPTION OF THE DRAWINGS

It is expressly understood that the drawings are included for illustrative purposes and do not represent the scope of the present system. It is to be understood that the figures may not be drawn to scale. Further, the relation between objects in a figure may not be to scale and may in fact have a reverse relationship as to size. The figures are intended to bring understanding and clarity to the structure of each object shown, and thus, some features may be exaggerated in order to illustrate a specific feature of a structure. In the accompanying drawings, like reference numbers in different drawings may designate identical or similar elements, portions of similar elements and/or elements with similar functionality. The present system is explained in further detail and by way of example with reference to the accompanying drawings which show features of various exemplary embodiments that may be combinable and/or severable wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, ingredients, element attributes, etc. However, it will be apparent to those of ordinary skill in the art that other embodiments that depart from these details would still be understood to be within the scope of the appended claims. Moreover, for the purpose of clarity, detailed descriptions of well-known devices, tools, techniques, and methods are omitted so as not to obscure the description of the present system.

The term “and/or,” and formatives thereof, should be understood to mean that only one or more of: the recited elements may need to be suitably present (e.g., only one recited element is present, two of the recited elements may be present, etc., up to all of the recited elements may be present) in a system in accordance with the claims recitation and in accordance with one or more embodiments of the present system. In the context of the present embodiments, the terms “about”, substantially and “approximately” denote an interval of accuracy that a person skilled in the art will understand to still ensure the technical effect of the feature in question which in some cases may also denote “within engineering tolerances.” For example, the terms may indicate a deviation from the indicated numerical value of ±20%, ±15%, ±10%, ±5%, ±1%±0.5% or ±0.1%. The terms user, users, or formatives thereof may refer to a user, operator, baker, and/or the like unless the context indicates otherwise.

Figure 1:
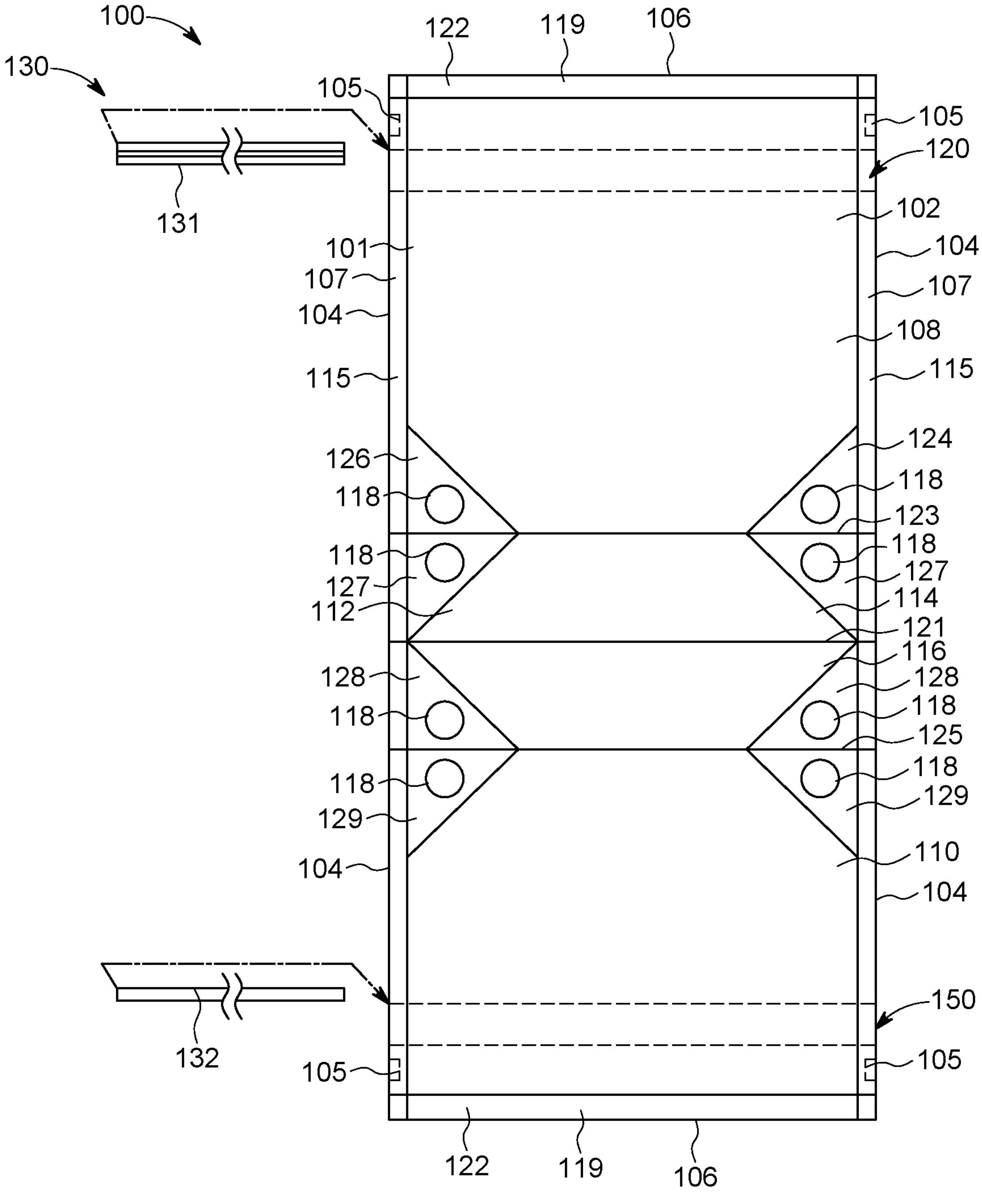
FIG. 1 shows an illustrative exploded front planer view of a portion of a system in accordance with embodiments of the present system.
Figure 2:
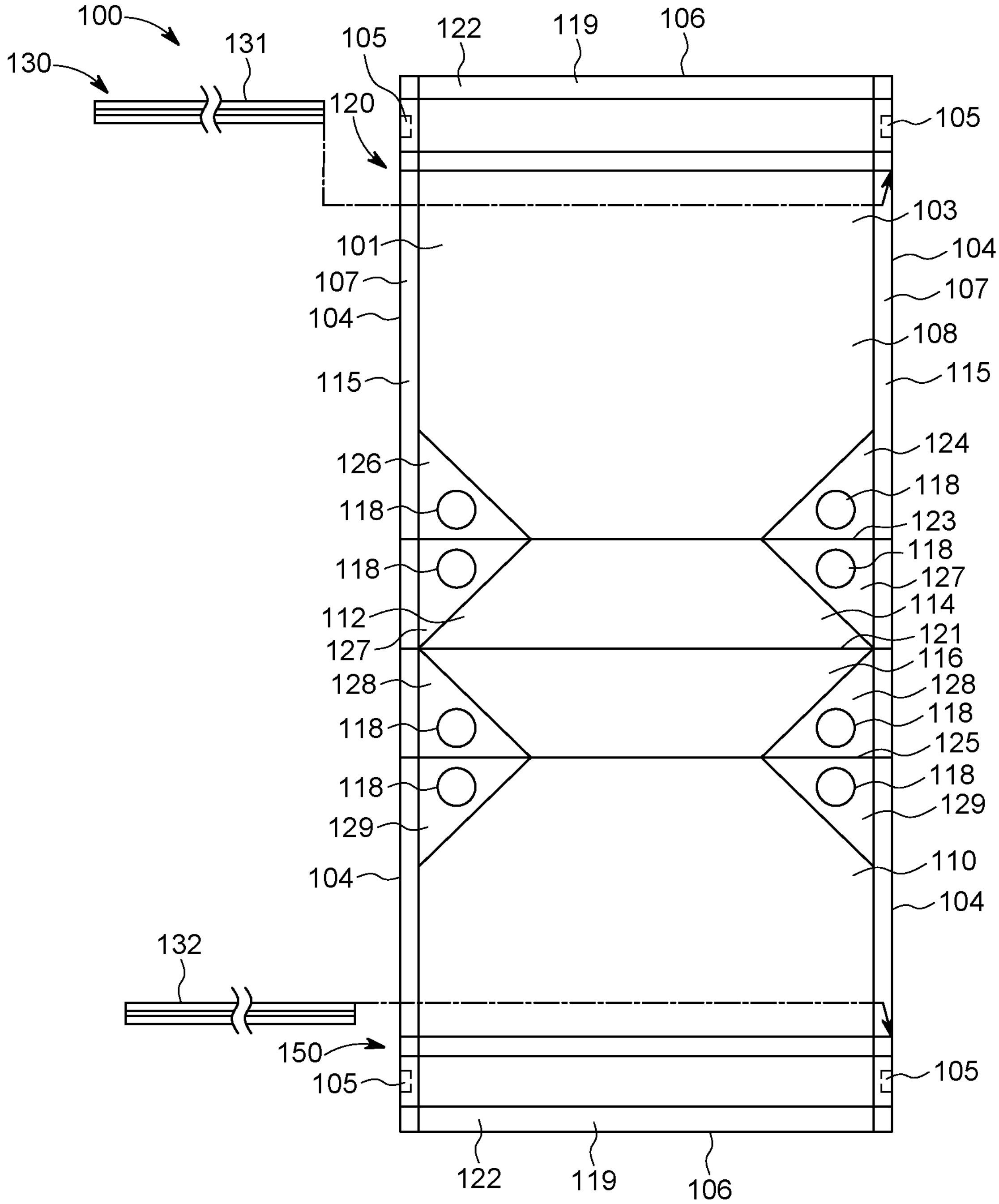
FIG. 2 shows an illustrative exploded back planer view of a portion of a surface of a substrate in accordance with embodiments of the present system.
Figure 3:
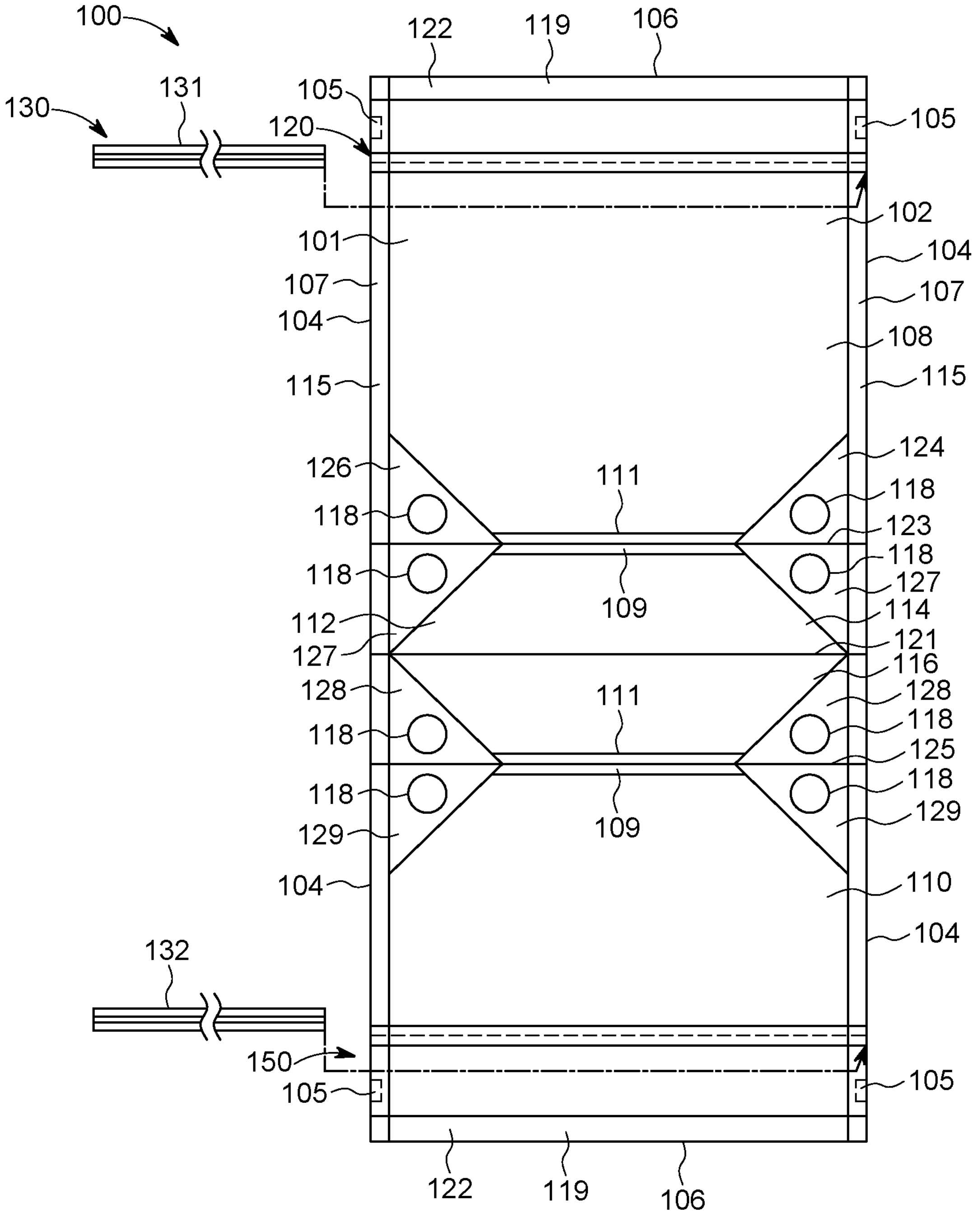
FIG. 3 shows an illustrative exploded front planer view of a substrate including optional sealing areas in accordance with embodiments of the present system.

FIG. 1 shows an illustrative exploded front planer view of a portion of a system 100 (hereinafter the system 100) in accordance with embodiments of the present system. FIG. 2 shows an illustrative exploded back planer view of a surface 102 of a substrate 101 in accordance with embodiments of the present system. FIG. 3 shows an illustrative exploded front planer view of the substrate 101 including optional sealing areas 109, 111 in accordance with embodiments of the present system. In accordance with embodiments of the present system, the system 100 is utilized to form a package as described further herein.

With reference to FIGS. 1, 2, 3, the system 100 may include a substrate 101 which may include a first surface 102 and a second surface 103 (e.g., on an opposite side of the first surface, such as a back side of the first surface) one or more of which may extend between opposing ends 106 and opposing edges 104. The opposing ends 106 and/or the opposing edges 104 may be continuous or discontinuous. For example, a weakened area such as a weakened line, a notch 105 or the like (e.g., a scored line, etc.) may extend partially or fully across the substrate 101 such as between the opposing edges 104. This weakened area may be formed at any time during formation of the system 100. During use, it is envisioned that portions of the substrate 101 may be separated from others at the weakened area to expose at least a portion of a cavity defined by the substrate 101. A re-closable fastener, hereinafter referred to as a zipper 130 for the sake of clarity (e.g., a zip-type closure which may employ an optional slider) may be attached to the substrate 101 such as on the second surface 103. In FIGS. 1, 2, 3, the zipper 130 is shown prior to attachment to the substrate 101 and particularly, prior to attachment of portions of the zipper 130 to corresponding closure areas 120, 150.

The substrate 101 may include a first panel 108 which may extend between the opposing edges 104, and between a fold 123 and one of the opposing ends 106. Similarly, the substrate 101 may include a second panel 110 which may extend between the opposing edges 104, and between a fold 125 and the other one of the opposing ends 106. Further, the substrate 101 may include tabs 126, 127, 128, 129 at, or adjacent to, opposing edge areas 115. One or more of the tabs 126, 127, 128, 129 may include an optional grasping area suitable for grasping by a user such as an opening 118. However, other types of grasping areas such as an embossed area, a tab, a hook, a loop, a strap, and/or the like are also envisioned. In embodiments in accordance with the present system, the opening 118 may include one or more surrounding weakened areas that may be torn or separated to provide for expansion of the opening 118 as desired.

A fold 121 may extend between the opposing edges 104 and may be situated between the folds 123, 125. End areas 122 and edge areas 115 may extend fully or partially about an outer periphery of the substrate 101. One of opposing end areas 122 may be located at each of the opposing ends 106 and may extend between the opposing edges 104. One of end sealing areas 119 may be located within a corresponding end area 122 and may extend between the opposing ends 106 and may be adjacent, or close to, a corresponding one of the opposing ends 106. The end areas 122 and the end sealing areas 119 are illustrated on both surfaces 102, 103 of the substrate 101 shown for example in FIGS. 1, 2 for the sake of clarity.

Each one of edge sealing areas 107 may be situated within a corresponding one of the edge areas 115 and may extend between the opposing edges 104 and may be adjacent to, or close to, a corresponding one of the opposing ends 106. The edge sealing areas 107 and the end sealing areas 119 may be separate from each other or may partially overlap each other. When the substrate 101 is folded, such as along the fold 121, adjacent portions of the edge sealing areas 107 on opposite sides of the fold 121 may be coupled to each other using any suitable bonding method such as direct bonding, surface activated bonding, plasma activated bonding, adhesive bonding, thermocompression bonding, etc., and/or combinations thereof. Similarly, when the substrate 101 is folded along the fold 121, adjacent portions of the end sealing areas 106 on opposite sides of the fold 121 may be coupled to each other using any suitable bonding method such as described.

A gusset 112 may include a first gusset 114 and a second gusset 116 situated on opposite sides of the fold 121. For example, the first gusset 114 may be located between the folds 121, 123 and tabs 127. The second gusset 116 may be located between the folds 121, 125 and tabs 128.

The zipper 130 may include a first portion 131 and a second portion 132 that may be coupled to the substrate 101. For example, the first portion 131 may be coupled to the closure area 120 which lies between the fold 123 and a corresponding one of the opposing ends 106. The second portion 132 may be coupled to the closure area 150 which lies between the fold 125 and a corresponding one of the opposing ends 106. During construction, the substrate 101 may be folded at folds 121, 123, 125 to form at least part of a cavity defined, at least in part, by the first panel 108, the second panel 110 and the gusset 112. Once the cavity is formed, the first portion 131 and the second portion 132 of the zipper 130 may be joined together to releasably couple to each other as desired and thereby, form a closure of the cavity.

Thus, for example, the cavity may be accessed when the zipper 130 is opened (e.g., when the first portion 131 and the second portion 132 of the zipper 130 are separated apart). In this way, at least a portion of the cavity may be closed by the zipper 130. Thus, access to at least a portion of the cavity may be controlled by opening or closing the zipper 130. The zipper 130 may be formed integrally with, or separately from, the substrate 101. In accordance with an embodiment of the present system, the zipper 130 may be coupled to the substrate 101 using any suitable coupling method such as thermal bonding, welding, direct bonding, surface activated bonding, plasma activated bonding, adhesive bonding, thermocompression bonding, etc.

The substrate 101 may be formed from any suitable material such as a polymer, plastic, rubber, paper (e.g., coated paper), etc., and/or combinations thereof. For example, it is envisioned that the substrate 101 may be formed from a polymer film including a plurality of layers superimposed upon each other. One or more of these layers may include an oxygen barrier layer and/or a water vapor barrier to retard the flow of oxygen and/or water vapor, respectively, through the substrate 101. This may provide for suitable sealing (e.g., hermetic, etc.) of the cavity formed by the substrate 101. In some embodiments, it is envisioned that the substrate 101 may be formed, at least in part, from a polymer such as polyethylene terephthalate/homopolymer linear low-density polyethylene, (PET/HB LLDPE) or other suitable material or materials.

One or more portions of the substrate 101 (e.g., the second surface 103) may include a design and/or a code (e.g., a quick response code (QR code) or the like which will be discussed below) which may be scanned to access instructions for using a container (e.g., a package) formed by the substrate 101. One or more of the first and second surfaces 102, 103, respectively, may be coated with a low-friction coating or the like and/or the material utilized to form the one or more of the first and second surfaces 102, 103 may provide a low-friction surface. For example, in accordance with embodiments of the present system, the first surface 102 may provide a low friction surface that may resist ingredients placed into the cavity (e.g., formed by the substrate 101) from adhering to the first surface 102. In some embodiments, it is envisioned that one or more of the first and second surfaces 102, 103 may include a low adhesion (e.g., non-stick) coating to prevent ingredients from sticking thereto, such as when the ingredients are placed into the cavity (e.g., formed by the substrate 101).

As previously stated, FIG. 3 shows an illustrative planer view of the substrate 101 including optional sealing areas 111, 109 in accordance with embodiments of the present system. In these embodiments, when the substrate is folded about the folds 121, 123, 125, those portions of the sealing areas 111, 109 that are adjacent to each other may be coupled to each other using any suitable bonding method such as thermal bonding, welding, adhesive, etc., such as described herein, to form a second end seal 113 (e.g., see, FIG. 4) which may reinforce the substrate 101 forming the package. During construction (e.g., forming of the package), the folds 123, 125 may be folded in an opposite direction to the fold 121 to form the cavity by the substrate 101. It should be noted that although the opposing edges 104 and the opposing ends 106 are illustrated shown as parallel or substantially parallel to each other, in embodiments in accordance with the present system, one or more of the opposing edges 104 and the opposing ends 106 may be non-parallel to each other as desired. For example, a portion of the opposing edges 104 may flare outward such that when the system 100 is formed (e.g., when the package is formed, such as during the process 1500 shown in FIG. 15), a portion of the system 100 may be wider than another portion of the system 100. For example, the first panel 108 may flare outward as the first panel 108 extends upward as shown in FIG. 1. Further, the second panel 110 may flare outward as the second panel 110 extends downward as shown in FIG. 1. In this way, after the package is formed, the opening into the cavity may be narrower (or wider) than the cavity itself. Similarly, in forming the package, the gusset may be narrower (or wider) than the cavity and the opening into the cavity. In addition, in accordance with embodiments of the present system, the flaring may change along the opposing edges 104 such that the gusset is wider (or narrower) than the cavity and the opening is wider (or narrower) than the cavity as desired.

It is appreciated that methods employed to couple portions of the substrate 101 to itself and/or to other portions may be selected such that they are compatible with the substrate 101 and/or these other portions. In some embodiments, the substrate 101 may include one or more optional films. For example, these films may be laminated upon the substrate 101 and may reinforce the substrate 101 in desired areas. In one or more embodiments, the substrate 101 may include one or more windows that facilitate a view into the cavity from outside the cavity after the cavity is formed during construction.

Figure 4:
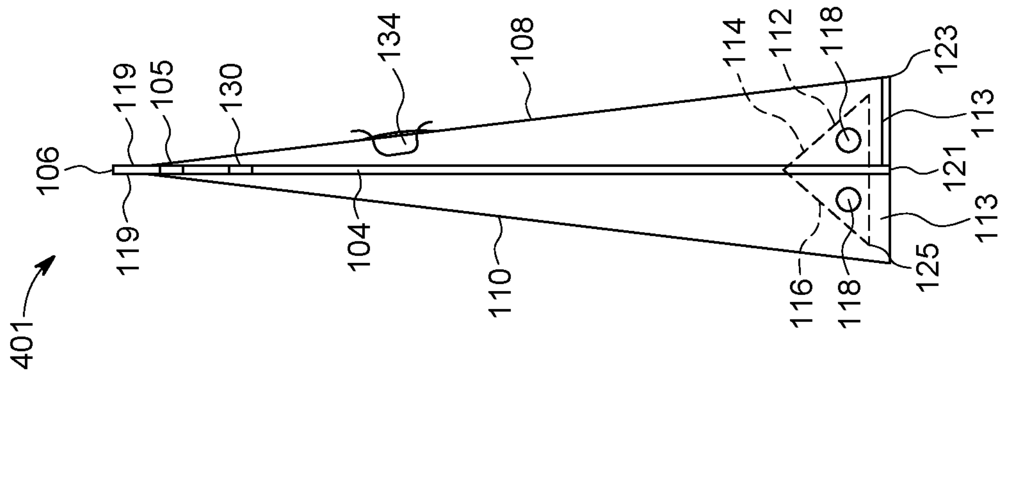
FIG. 4 shows an illustrative partially cutaway planar end view of the substrate 101 folded and sealed to form a package in accordance with embodiments of the present system.
Figure 5:
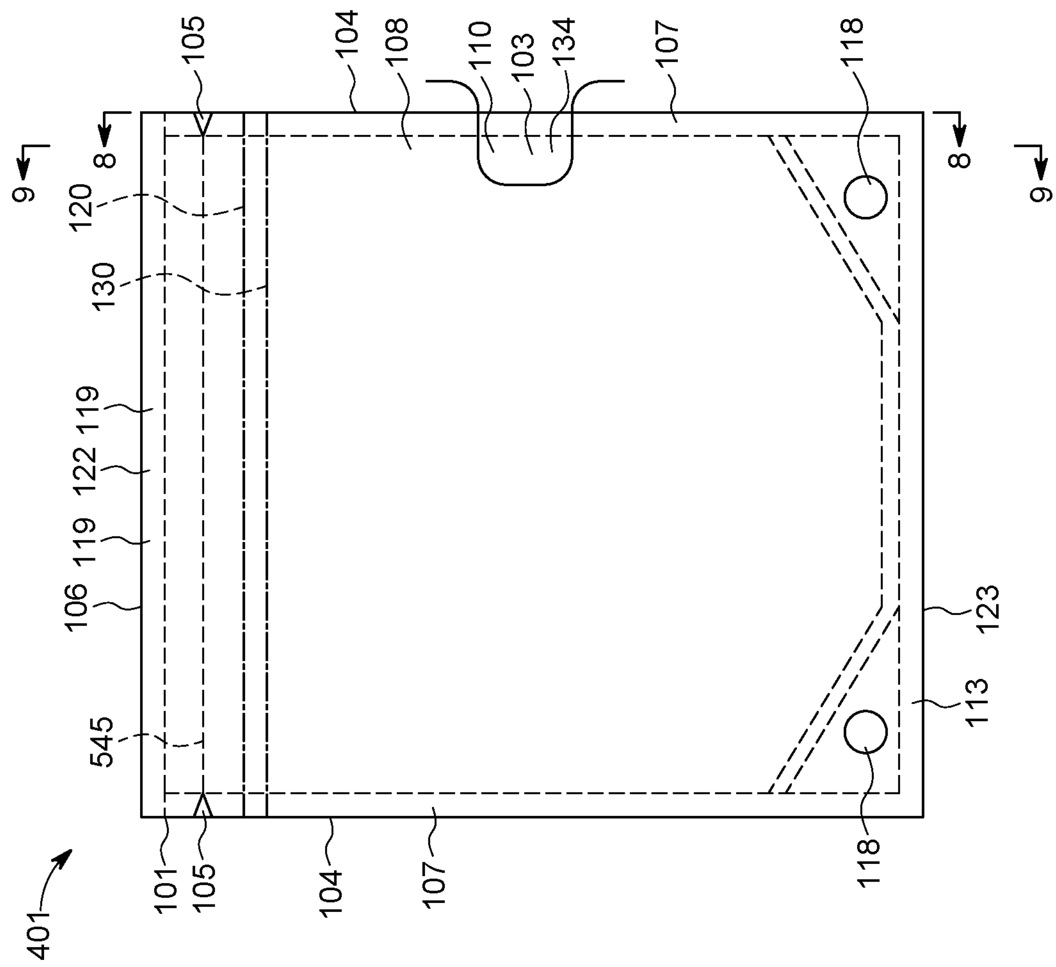
FIG. 5 shows an illustrative partially cutaway planer side view of a package in accordance with embodiments of the present system.
Figure 6:
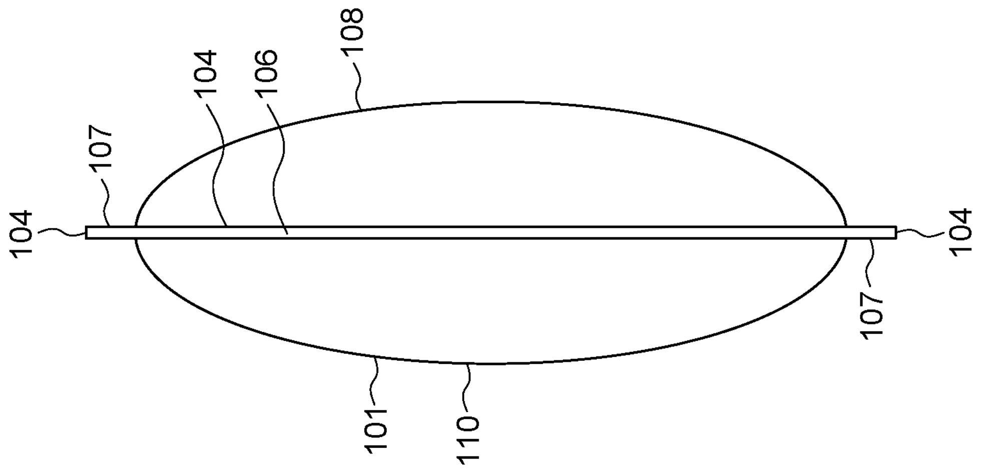
FIG. 6 shows an illustrative planer top view of a package in accordance with embodiments of the present system.
Figure 7:
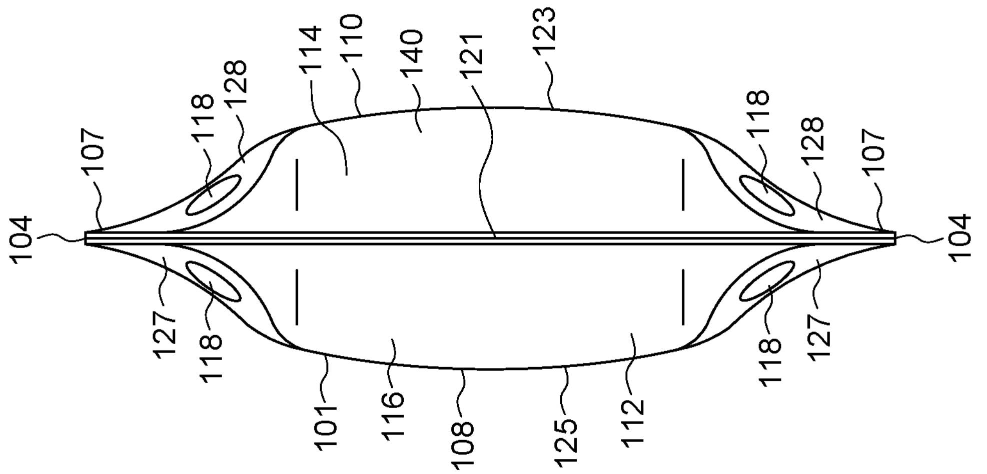
FIG. 7 shows an illustrative planer bottom view of a package in accordance with embodiments of the present system.

FIG. 4 shows an illustrative partially cutaway planar end view which shows the substrate 101 folded and sealed to form a package 401 in accordance with embodiments of the present system. FIG. 5 shows an illustrative partially cutaway planer side view of the package 401 in accordance with embodiments of the present system. FIG. 6 shows an illustrative planer top view of the package 401 in accordance with embodiments of the present system. FIG. 7 shows an illustrative planer bottom view of the package 401 in accordance with embodiments of the present system. In FIG. 4 and FIG. 5, a portion of the first panel 108 in a cutaway view to illustrate a cavity 134 formed during construction of the package 401.

With reference to FIG. 4 through FIG. 7, after folding the substrate 101 at folds 121, 123, 125, adjacent edge sealing areas 107 may be coupled to each other using any suitable method, or methods, such that the first panel 108, the second panel 110, and the gusset 112 may form at least a portion of the cavity 134. Adjacent end sealing areas 119 of the first panel 108 and the second panel 110 may be optionally coupled to each to seal the cavity 134 with one or more desired ingredients and/or implements sealed within, such as to form a kit (e.g., a baking kit) as will be discussed further herein.

In embodiments wherein portions of the zipper 130 lie within the edge sealing area 107, these portions of the zipper 130 may be thermally sealed and/or bonded to each other using any suitable method or methods such a thermal bonds, heat bonds, adhesive bonds, etc. It is also envisioned that portions of the zipper 130 that lie within the edge sealing area 107 may be melted and/or substantially flattened as desired during construction of the package 401. When, the substrate 101 is folded during construction of the package 401, adjacent portions of the edge sealing areas 107 on opposite sides of the fold 121 may be coupled to each other using any suitable bonding method(s) such as illustratively described herein. Similarly, when, the substrate 101 is folded at the folds 121, 123, 125, adjacent portions of the end sealing areas 122 may be coupled to each other using any suitable bonding method(s) such as illustratively described herein.

To access the cavity 134 after construction of the package 401, one or more portions of the substrate 101 may be torn, or otherwise separated, for example at a weakened area of the package 401, such as at the notch 105, to gain access to at least a portion of the cavity 134. For example, during operation a user of the system may tear portions of the substrate 101 along a weakened area 545 to partially or entirely remove portions of the substrate 101 that lie between the weakened area and the opposing ends 106. Thus, the package 401 may be torn starting at one of the opposing edges 104 at the weakened area (e.g., at one of the notches 105) and this tear may extend fully or partially across the package 401 towards another one of the opposing edges 104. In some embodiments, the substrate 101 may include materials having an orientation to promote tearing in one or more directions such as across the package 401 between the opposing edges 104. Once torn, the package 401 may form an opening leading to the cavity 134 such that a user may access the cavity 134 to, for example, remove and/or insert ingredients such as flour, sugar, butter, water, salt, spices, etc. Further, once the package is torn, the user may open or close the zipper 130 to control access to at least a portion of the cavity 134. Thus, the zipper 130 may be opened or closed to expose at least a portion of the cavity 134. The second end seal 113 may increase rigidity of the substrate 101 to enhance support to the package 401 when situated, for example, on preparation surface such as a table, a counter, or the like. That portion of the package 401 at the second end seal 113 (or folds) may be referred to as a bottom of the package for the sake of clarity.

With reference to FIG. 7, the substrate 101 may define at least a portion of a support cavity 140. More particularly, one or more of the gussets 114, 116, the tabs 126, 127, 128, 129, and/or the edge sealing areas 107 may define at least a portion of the support cavity 140 suitable for grasping by a user to support, move, and/or manipulate the package 401 such as during use. For example, the support cavity 140 may be configured to receive at least a portion of a hand of user such that the user may insert at least a portion of a finger through at least a portion of one or more of the optional openings 118. In yet other embodiments, an embossed area may be provided rather than the optional openings 118. In some embodiments it is envisioned that a tab or loop may be provided. In some embodiments, it is envisioned that portions of the second end seal 113 (e.g., see FIGS. 4, 5) may be coupled to each other so as to form a loop, which may operate as a grasping pocket (e.g., an area of the substrate 101 that facilitates manipulation of the package), at the support cavity 140. For example, in some embodiments, portions of the substrate at the folds 123, 125, or edge sealing areas 107 that are at or in proximity to the edge sealing areas may be coupled together to form at least one grasping pocket as described herein below with reference to FIG. 13 and FIG. 14. Thus, the support cavity and/or the support pocket may provide an area for a user to grasp and/or otherwise manipulate the package from the outside during use such as when kneading a mixture of ingredients within the cavity to form a dough.

In forming the package, after folding, the adjacent portions of the substrate at tabs 126, 127 may be coupled to each other using any suitable method for example as described herein, such as thermal bonding. Similarly, after folding, the adjacent portions of the substrate at tabs 128, 129 may be coupled to each other using any suitable method such as thermal bonding. By coupling the adjacent tabs as described, the rigidity of these tabs may be increased and at least a part of the seal to the cavity may be provided.

In some embodiments, it is envisioned that the package may have a width measured between the opposing edges 104 and may have a height when measured between one of the folds (e.g., the fold 123) and a corresponding opposing end 106. In some embodiments, it has been found that a formed package that has a shorter height than the width of the package may aid handing of the package and manipulation of the ingredients within the package during use. For example, in some embodiments, the package may have a width of about eight inches +/−two inches, a height of about nine inches +/−two inches, with a gusset having a width of about four inches +/−one inch when measured between the folds 123, 125.

Figure 8:
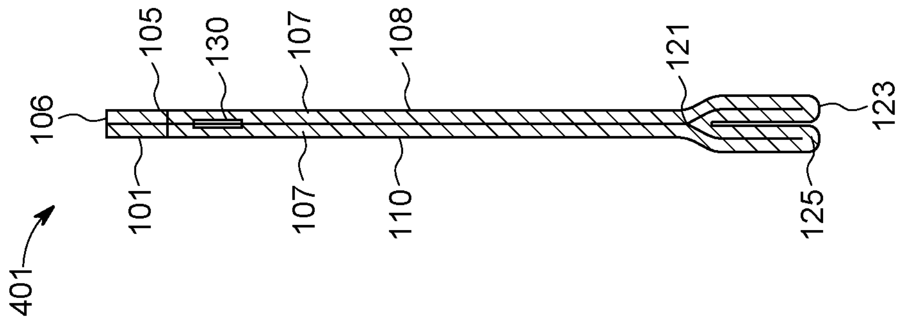
FIG. 8 shows an illustrative cross-sectional view of the package of FIG. 5 in accordance with embodiments of the present system.

FIG. 8 shows an illustrative cross-sectional view of the package 401 taken along lines 8-8 of FIG. 5 in accordance with embodiments of the present system. Adjacent portions of the substrate 101 are attached to each other along the edge sealing area 107. As shown, in forming the package, fold 121 is folded in an opposite direction to folds 123, 125. Folds 123, 125 are folded in the same direction as each other. That portion of the zipper 130 that extends into the edge sealing area 107, if any, may be thermally bonded and flattened to form a seal.

Figure 9:
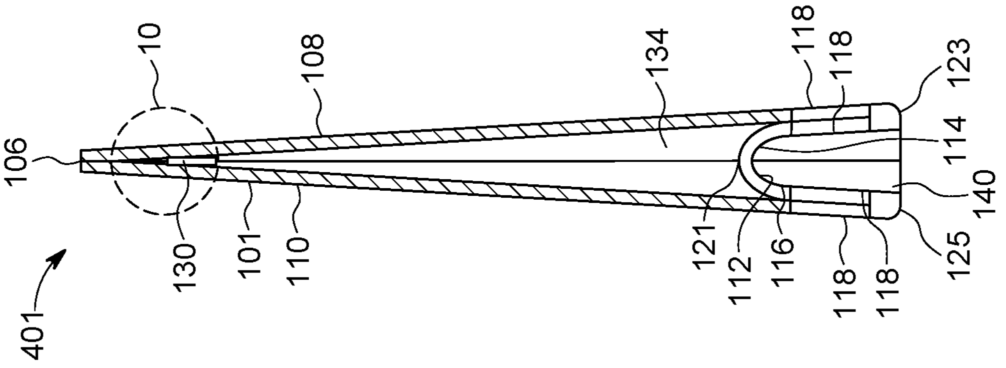
FIG. 9 shows an illustrative cross-sectional view of the package of FIG. 5 in accordance with embodiments of the present system.

FIG. 9 shows an illustrative cross-sectional view of the package 401 taken along lines 9-9 of FIG. 5 in accordance with embodiments of the present system. Adjacent ones of the openings 118 may be aligned with each other after the package is formed such that a user may optionally insert a finger at least partially through the opening during use to aid grasping the package 401. A portion of the substrate 101 may form at least a portion of a support cavity 140 in which a user may insert one or more fingers to grasp the package 401 during use. The cavity 134 may be defined at least in part by the first panel 108, the second panel 110, and the gusset 112.

Figure 10:
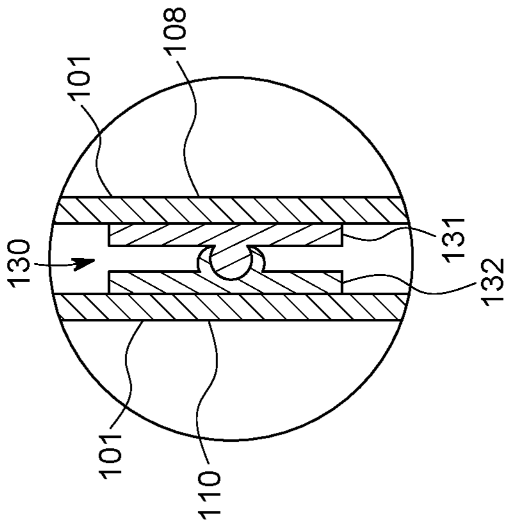
FIG. 10 shows an illustrative enlarged detailed view of a portion of a package in accordance with embodiments of the present system.

FIG. 10 shows an illustrative enlarged detailed view of an area 10 of FIG. 9 in accordance with embodiments of the present system. The zipper 130 is shown in a closed position in which the first portion 131 and the second portion 132 are coupled to each other using any suitable method such as an interference fit or the like. The first portion 131 and the second portion 132 may be pulled apart from each other to open the zipper 130. In the open position the first portion 131 and the second portion 132 may be releasably decoupled from each other in that portion that is situated between the opposing edge areas 107 (e.g., see, FIG. 5).

Figure 11:
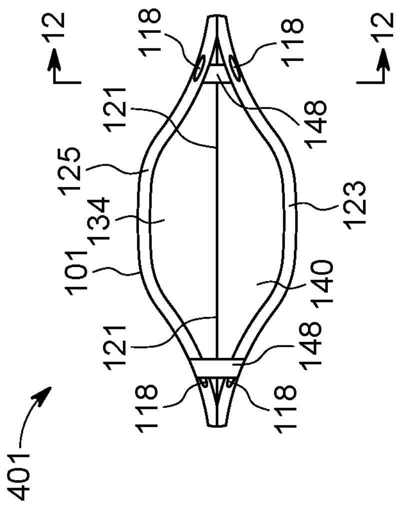
FIG. 11 shows an illustrative planer bottom view of a package including support straps in accordance with embodiments of the present system.

FIG. 11 shows an illustrative planer bottom view of the package 401 including support straps 148 in accordance with embodiments of the present system. The support straps 148 may extend across the support cavity 140 such that a user may grasp at least one of the support straps 148 during use. Thus, the support straps 148 may be configured to be grasped by a user and may also limit the outward expansion of the support cavity 140. The support straps 148 may be coupled to the substrate 101 at or proximate to the corresponding folds 123, 125, using any suitable coupling method such as, for example, thermal bonding, adhesive, etc.

Figure 12:
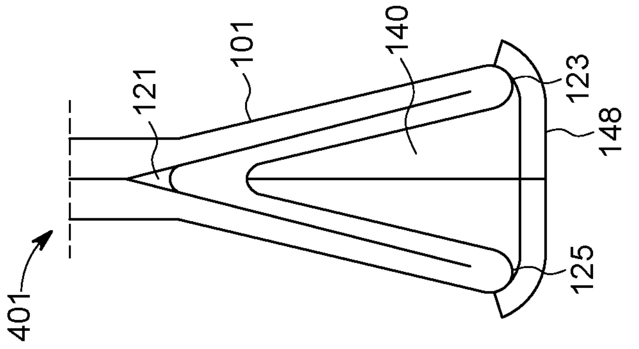
FIG. 12 shows an illustrative detailed side view of a portion of a package including support straps in accordance with embodiments of the present system.

FIG. 12 shows an illustrative detailed side view of a portion of the package 401 including the support straps 148 taken along lines 12-12 of FIG. 11 in accordance with embodiments of the present system. As shown, in an embodiment of the present system, the support straps 148 may be affixed extending past the corresponding folds 123, 125.

Figure 13:
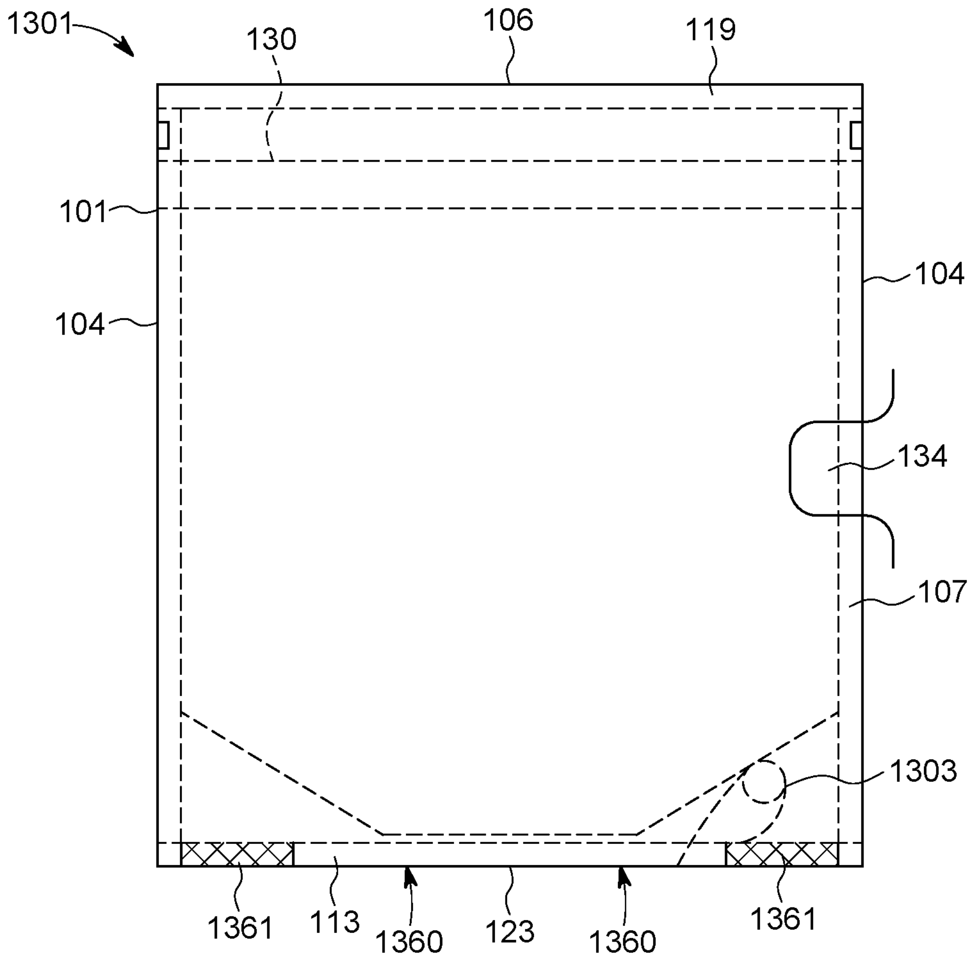
FIG. 13 shows an illustrative partially cutaway planer side view of a package in accordance with embodiments of the present system.
Figure 14:
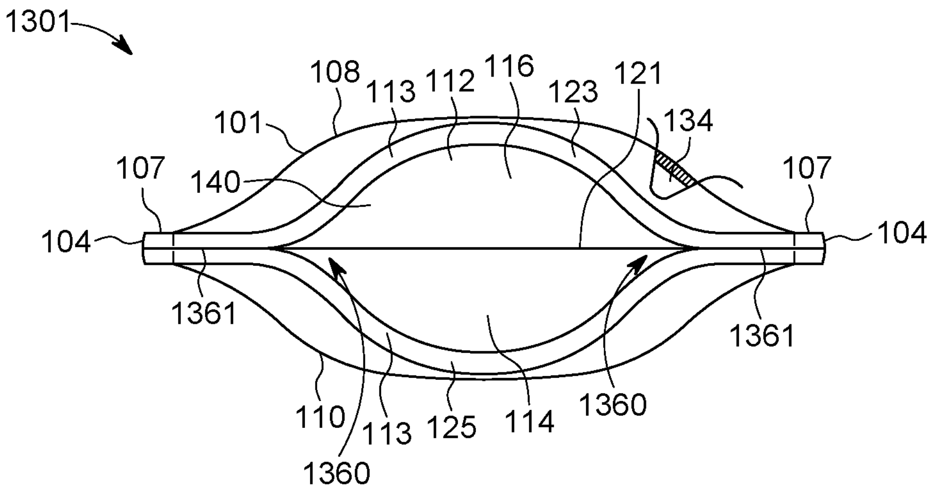
FIG. 14 shows an illustrative planer bottom view of a package in accordance with embodiments of the present system.

FIG. 13 shows an illustrative partially cutaway planer side view of a package 1301 and FIG. 14 shows an illustrative planer bottom view of the package 1301, each figure in accordance with embodiments of the present system. With reference to FIG. 13 and FIG. 14, a package 1301 may include at least one grasping pocket 1360 in the support cavity 140. The at least one grasping pocket 1360 may be configured to receive at least one finger 1303 of the user during use. The at least one grasping pocket 1360 may aid a user to grasp the package 1301. To form the at least one grasping pocket 1360, the second end seals 113 at the folds 123, 125 may be coupled to each other using any suitable method or methods such as a thermal bond or seal, an adhesive, a fastener (e.g., a staple, a rivet, etc.) or the like, illustratively shown as a cross-hatched area 1361. As previously shown, openings within the tabs may be provided in accordance with these embodiments (e.g., see, FIG. 5, openings 118).

Figure 15:
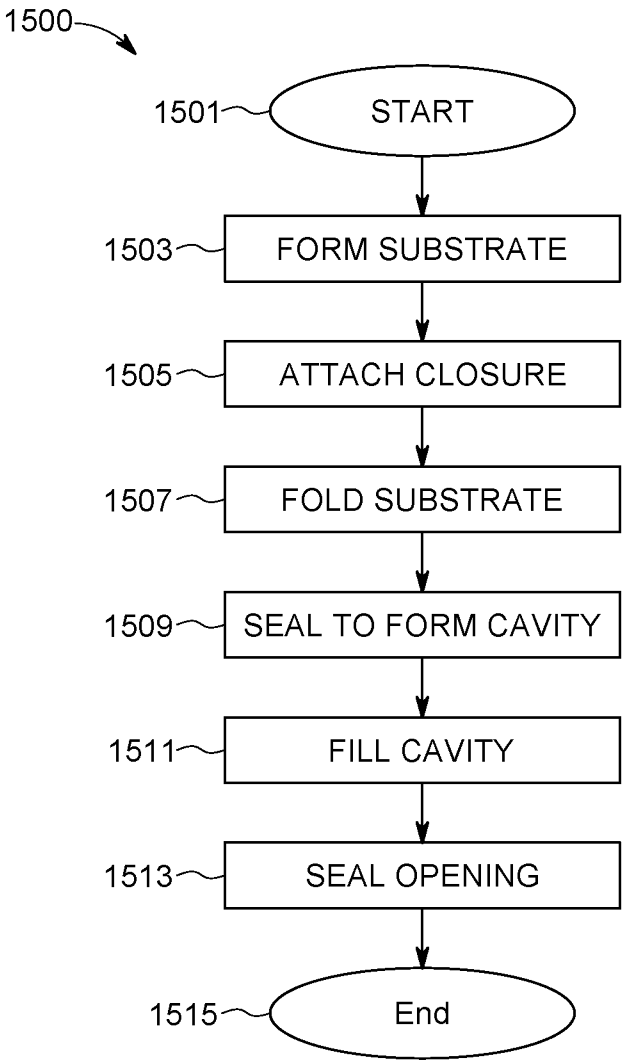
FIG. 15 shows an illustrative functional flow diagram performed by a process in accordance with embodiments of the present system.

FIG. 15 shows an illustrative functional flow diagram performed by a process 1500 in accordance with embodiments of the present system. The process 1500 may be performed using one or more processors, computers, controllers, etc., communicating over a network and may obtain information from, and/or store information to one or more memories which may be local and/or remote from each other. The process 1500 may include one of more of the following acts. In accordance with embodiments of the present system, the acts of the process 1500 may be performed using a controller operating in accordance with embodiments of the present system. Further, one or more of these acts may be combined and/or separated into sub-acts, as desired. In addition, one or more of these acts may be skipped depending upon settings. For the sake of clarity, the process is described with reference to a single package. However, without limitation, it is understood that the process 1500 may employ a plurality of packages each of which may include a separate workflow such as a sub-workflow. In operation, the process 1500 may start during act 1501 and then proceed to act 1503.

During act 1503, the process may form a substrate in accordance with embodiments of the present system. Accordingly, the process may be operative to form the substrate using any suitable method or methods such as cutting (e.g., laser, or die stamping, etc.) to form the substrate from a roll of material that may have been printed by the process. The formed substrate may then be further processed and/or positioned by the process 1500 for further operations. For example, during the process a QR code may be applied to a portion of the roll of the substrate material such that this QR code may be displayed on an outside of a package subsequently formed by the substrate. Subsequently the QR code may be scanned by the user, such as during use of the subsequently formed package. After completing act 1503, the process may continue to act 1505.

During act 1505, the process may attach a resealable closure to the formed substrate. This closure may, for example, include a re-closable fastener such as a zipper asa describe herein. The resealable closure may be thermally sealed to corresponding portions of the formed substrate. After completing act 1505, the process may continue to act 1507. During act 1507, the process may fold the formed substrate. Accordingly, the process may control one or more actuators to position and/or fold the formed substrate so as to form a folded substrate. After completing act 1507, the process may continue to act 1509.

During act 1509, the process may seal or otherwise bond the folded substrate to form at least a portion of a cavity suitable for receiving one or more ingredients and/or accessories (e.g., mixing sticks, gloves, parchment sheets, etc.) within the substrate. During the sealing, the process may further couple the adjacent edge sealing areas together using any suitable method or methods such as thermal sealing, etc., as described herein. The process may further couple adjacent portions of the tab areas together and/or may couple adjacent portions of the substrate together to form a second end seal. In some embodiments, the process may couple portions of the end seal together to form at least one grasping pocket. It is envisioned that in some embodiments, the process may further form an opening suitable for a user to grasp in the tabs and/or may attach one or more support straps to the substrate. After completing act 1509, the process may continue to act 1511.

During act 1511, the process may fill the cavity with one or more desired ingredient and/or ingredient packages, such as one or more packages of flour, flavorings (e.g., vanilla, etc.), sugar (e.g., a sugar mixture), etc. The ingredient packages may be matched to a size and/or shape of the cavity within the package. The process may further add one or more accessory items to the cavity. These one or more accessory items may include, for example, craft sticks, gloves, measuring spoons, cups, and/or bags, and/or parchment paper, etc. The accessory items may be employed by the user during preparation and/or baking. For example, the gloves may be employed by a user to remove prepared dough from the cavity. The craft stick may be used to scrape the cavity to remove any prepared dough which may stick to the substrate. The parchment paper may be used to hold the prepared dough when subsequently cooking the prepared dough. This may obviate the need to purchase these items separately and/or streamlines the preparation and cleaning process. Accordingly, the process may control one or more actuators to place the ingredient packages within the cavity as well as the optional accessory items. The one or more desired ingredient packages may include bags and/or resealable packages such as a prefilled measuring cup which may be emptied and refilled with another desired ingredient (e.g., water, etc.) during use in accordance with embodiments of the present system. In this way, the package together with its contents operates as a baking kit wherein all of the items required for preparing the dough prior to baking is provided either by the package itself or is provided within the package. After completing act 1511, the process may continue to act 1513.

During act 1513, the process may be operative to seal the opposing ends of the substrate so as to seal at least a portion of the cavity. During this sealing, the process may further couple adjacent end sealing areas at, or adjacent to, the opposing ends together using any suitable method or methods such as thermal bonding or sealing, etc. After completing act 1513, the process may continue to act 1515 where it may end.

Figure 16:
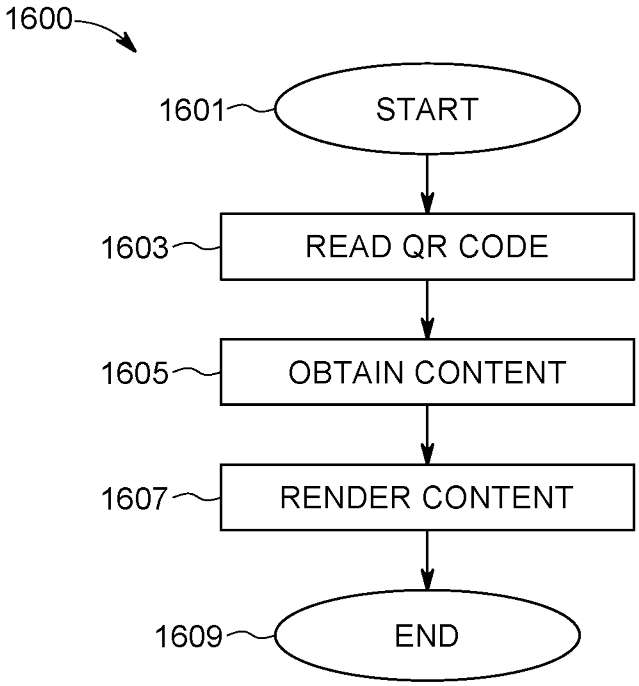
FIG. 16 shows an illustrative functional flow diagram performed by a process in accordance with embodiments of the present system.

FIG. 16 shows an illustrative functional flow diagram performed by a process 1400 in accordance with embodiments of the present system. The process 1600 may be performed using one or more processors, computers, controllers, etc., communicating over a network and may obtain information from, and/or store information to one or more memories which may be local and/or remote from each other. The process 1600 may include one of more of the following acts. In accordance with embodiments of the present system, the acts of process 1600 may be performed using a controller operating in accordance with embodiments of the present system. Further, one or more of these acts may be combined and/or separated into sub-acts, as desired. Further, one or more of these acts may be skipped depending upon settings. For the sake of clarity, the process may be described with reference to a single package. However, without limitation, it is understood that the process may employ a plurality of packages, each of which may include a separate workflow such as a sub-workflow. In operation, the process 1600 may start during act 1601 and then proceed to act 1603.

During act 1603, the process may read a code (e.g., matrix barcode), such as a QR code, which may be printed on a package formed in accordance with embodiments of the present system. For purposes of simplifying the discussion, a QR code is illustratively discussed in the context of the process. However, it is understood that any machine-readable code may be suitably employed. In operation, sensors may be activated which have an optical scanner to read the QR code. This QR code may be printed on a package formed in accordance with embodiments of the present system. The process may then form corresponding QR information. After completing act 1603, the process may continue to act 1605.

During act 1605, the process may query a database for content in accordance with the QR code for corresponding content. The database may be stored on a memory of the system and may be local or distributed throughout a memory of the system. In accordance with embodiments of the present system, the content may be stored in a remote memory, such as one stored in a memory that is accessible through a connection, such as a connection to the Internet (e.g., a wired and/or wireless connection). The content corresponding to the query may then be retrieved from the database. The corresponding content may include information related to using the corresponding package such as opening instructions, mixing instructions, measurement instructions, timing instructions (e.g., wait 5 minutes after mixing, etc.), baking time instructions, (e.g., bake for 10 minutes, etc.) and/or baking temperature instructions (e.g., bake at 375 deg. F), etc. The content may include audio and/or video content. After completing act 1605, the process may continue to act 1607.

During act 1607, the process may render the content on a rendering device of the system for the convenience of a user (e.g., on a laptop, tablet, smartphone, etc.). Accordingly, the process may provide the corresponding content to a selected rendering device such as a display of a smartphone of the user for viewing of the content. The process may select the rendering device in accordance with system and/or user settings. For example, the process may render the content on the device that was utilized for reading the QR code. After completing act 1607, the process may continue to act 1609 where it may end.

Figure 17:
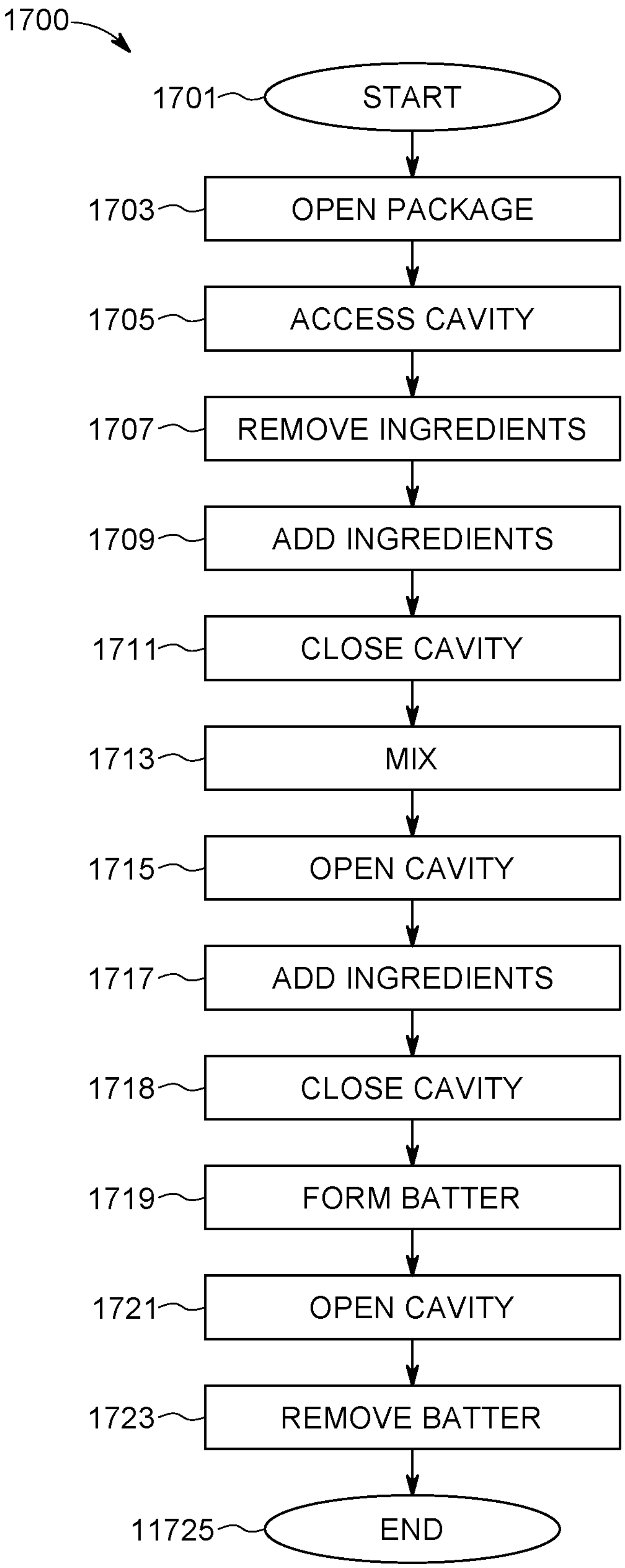
FIG. 17 shows an illustrative functional flow diagram performed by a process in accordance with embodiments of the present system.

FIG. 17 shows an illustrative functional flow diagram performed by a process 1500 in accordance with embodiments of the present system. The process 1700 may be performed using one or more processors, computers, controllers, etc., communicating over a network and may obtain information from, and/or store information to one or more memories which may be local and/or remote from each other. The process 1700 may include one of more of the following acts. In accordance with embodiments of the present system, the acts of process 1700 may be performed using a controller operating in accordance with embodiments of the present system. Further, one or more of these acts may be combined and/or separated into sub-acts, as desired. Further, one or more of these acts may be skipped depending upon settings. For the sake of clarity, the process may be described with reference to a single package. However, without limitation, it is understood that the process may employ a plurality of packages, each of which may include a separate workflow such as a sub-workflow. In accordance with embodiments of the present system, a package herein may be configured as a kit that includes items that may be utilized for performing the process. For example, the package/kit may include many of the items that are required for performing the process. For example, in a process in accordance with embodiments of the present system wherein the process is utilized to prepare dough, many of the ingredients and other material utilized for preparing the dough may be included in the package/kit. In any event, the process 1700 may start during act 1701 and then proceed to act 1703.

During act 1703, the package may be opened. Accordingly, the package may be torn along a weakened area of the package as discussed herein, such as along the weakened area 545 shown in FIG. 5. After completing act 1703, the process may continue to act 1705. During act 1705, the cavity of the package may be accessed and thereafter, the process may continue to act 1707 where accessories (e.g., gloves, parchment, and/or measuring cups, etc.) and/or ingredients within the cavity may be removed. In accordance with embodiments of the present system, the ingredients contained within the cavity (e.g., contained within the (outer) package, see, FIG. 4, the package 401) may be separately packaged. For example, one or more prepackaged ingredients may be contained within an enclosure, package, container, etc. (generally, package), separate from the (outer) package, as well as being contained within the cavity. The packages for the ingredients may include a weakened area, cap, etc., to facilitate opening for removal of the ingredients therefrom. Further, the ingredient packages may have one or more markings, for example, to indicate an amount of the ingredient contained therein. The ingredient packages may be marked, for example, with a number, letter, or other indication (e.g., 1, 2, 3, 4) that indicates an order to add the ingredients back into the package to make following the method, for example illustrated in FIG. 17 discussed herein, as easy as possible. For example, ingredient packages may be numbered: #1 for a sugar mixture ingredient; #2 for a vanilla extract ingredient; #3 for a flour mixture ingredient; and #4 for sprinkles, chocolate chips and/or raisins ingredients, etc. Further, one or more of the accessories contained within the cavity may also include an indication of an order of use when performing the method of the present system. This order indicated on one or more of the ingredient package(s), the accessories, etc., may be the same for every flavor (e.g., type of finished product for all packages/kits produced) to give a user (e.g., the consumer) a real baking experience and familiarity with the kit(s) without the stress of measuring and/or ordering the method of combining the ingredients. In this way, the user may be provided with the indications on the ingredient packages, accessories, etc., so that they are clearly identified as to when they should be used during the method of the present system (e.g., while following the recipe). In addition to the indications being provided on the ingredient packages, the (outer) package (e.g., the package (401)) may include an indication of the contents (e.g., ingredients) contained therein, such as: “Kit Contains: #1 Sugar Mixture; #2 Vanilla Extract; #3 Flour Mixture; #4 Added Sprinkles or Chocolate Chips and/or Raisins. The indication on the (outer) package may also include an indication of the accessories contained therein and/or an indication of an order of use of one or more of the accessories when performing the method of the present system.

In some embodiments, the re-closable closure, such as the zipper, may be opened or closed while accessing the cavity of the package. The accessories and/or ingredients (e.g., prepackaged ingredients that are separately wrapped) may have been placed within the cavity prior to sealing the package to form a baking kit. For example, ingredients such as flour, flavorings (e.g., chocolate, vanilla, lemon, etc.), sugar, fruit, chocolate chips, etc. may be contained within the package prior to the package be initially sealed. One or more of the ingredients may be provided in a reusable container which may, for example, be reused later such as for measuring ingredients, water, etc., that may be added to the package, ingredients, etc., during the process. After completing act 1707, the process may continue to act 1709.

During act 1709, ingredients may be added to the cavity in accordance with instructions rendered by the system (e.g., such as provided as a result of performing the process 1600). Some of the ingredients added to the cavity may be one or more of the prepackaged ingredients provided in the kit (e.g., flour, flavoring, etc., after being removed from the prepackaging). Further, one or more additional ingredients not included in the kit may also be added to the cavity, such as butter, water, etc. As readily appreciated, the instructions may also be provided (e.g., printed) directly on the package and/or may be separately provided within the package. After completing act 1709, the process may continue to act 1711 where the re-closable closure such as the zipper may be closed. It is envisioned that prior to closing the re-closable closure, air within the cavity, such as most of the air within the cavity may be removed from within the cavity (e.g., the air may be squeezed out of the package as the zipper is closed). Surprisingly and in accordance with embodiments of the present system, the removal of most of the air from within the package at this stage of the process, greatly enhances the effectiveness of subsequent particular acts of the process as compared to if the air had been left within the package during this act. For example, the removal of most of the air from the cavity of the package during this act of the process may enhance and/or facilitate subsequent mixing of the contents within the cavity. After completing act 1711, the process may continue to act 1713.

During act 1713, the ingredients within the closed cavity may be mixed. In accordance with embodiments of the present system, a user may grasp the package and mix the ingredients contained within the closed cavity by manipulating (e.g., kneading) the exterior of the package. For example, the user may employ one or both hands to grasp the package (e.g., at the support cavity, the at least one grasping pocket, etc. as described herein) and may manipulate the package to mix the contents contained therein (e.g., ingredients, etc.) to form a mixture (e.g., a dough, batter, cookie dough, etc.) within the cavity. In some embodiments a mixing device may manipulate the package. After completing act 1713, the process may continue to act 1715.

During act 1715 the cavity may be opened by opening the re-closable closure. After completing act 1715, the process may continue to act 1717. During act 1717, additional ingredients (e.g., water, etc.) may be added to the cavity for subsequent mixing with the prior added contents of the package. For example, the water may be measured using a container in which one or more of the ingredients (e.g., vanilla) were previously stored within the package/kit. For example, the container may be sized not only for the ingredient initially contained therein, but also to accommodate a desired portion of water, etc., that may be subsequently added. This container may include a screw-off top and/or may have a marking to indicate an amount of flavoring, water, etc., contained within the container. As discussed herein, the container may also be marked with an indication (e.g., a number) to indicate an order of adding the ingredient(s) contained in the container back into the cavity when following the method of the present system. As appreciated in accordance with the present system, by including the ingredients, accessories, container(s), indications of when to use, etc., within and/or on the package, ingredients package, container, etc., a kit is created that greatly facilitates the subsequent preparation of the dough, batter, cookie dough, etc., over that which was provided by prior systems. For example, in the kit in accordance with the present system, not only are prepackaged ingredients provided, additionally the container wherein mixing occurs is also provided as well as appropriately size/marked containers for additional ingredients (e.g., as may be provided by one or more containers for the included ingredients), the accessories, etc., that may be required for the preparation of the dough, batter, cookie dough, etc.

After completing act 1717, the process may continue to act 1718 where the re-closable closure such as the zipper may be closed. It is envisioned that prior to closing the re-closable closure, air within the cavity is allowed to remain within the cavity (e.g., much or all of the air within the package is left within the cavity as the zipper is closed). For example, more air is purposefully left within the cavity during act 1718 than during act 1711 previously. Surprisingly and in accordance with embodiments of the present system, leaving the air within the package at this stage of the process, greatly enhances the effectiveness of subsequent particular acts of the process as compared to if the air had been squeezed out of the package during this act. For example, allowing the air to remain within the cavity of the package during this act of the process, may enhance and/or facilitate subsequent forming of the final product (e.g., dough, batter, cookie dough, etc.) within the cavity. After completing act 1718, the process may continue to act 1719.

During act 1719, a mixture such as cookie dough may be formed by mixing (further mixing) the ingredients contained within the (closed) package such as be kneading the ingredients from outside the closed package. For example, an exterior portion of the package may be manipulated to thoroughly mix the additional ingredients into the existing mixture to form the new mixture which may be, for example, be a dough, batter, cookie dough, etc. Surprisingly, the use of the package/kit of the present system greatly improves over prior systems for combining ingredients such as for the preparation of a dough, batter, cookie dough, etc. A process in accordance with the present system greatly improves over prior systems because, for example, the manipulation of the ingredients in accordance with the process described herein (e.g., see the process 1700), avoids the pitfalls of prior systems, such as overmixing of the ingredients, as may occur with prior systems, which can adversely affect the final product.

After completing act 1719, the process may continue to act 1721 during which the re-closable closure may be opened to access the cavity. After completing act 1721, the process may continue to act 1723 during which the (final) mixture within the cavity may be removed and may be consumed or may be further processed such as by baking and/or storage of the mixture. As readily appreciated, more or less cycles of adding ingredients to the package for mixing, etc., may be performed dependent on the type of final product (e.g., dough, etc.) being prepared. In accordance with embodiments of the present system, the selection of ingredients to contain or be added to the mixture during the process 1700 may be made to ensure that the final mixture is edible, even in the absence of subsequent baking. For example, flour that is included in the kit may be cooked before being added to the kit and ingredients, such as raw eggs, etc., may be avoided to ensure that the final mixture is edible, even if it is consumed raw. After completing act 1723, the process may continue to act 1725 where it may end.

Figure 18:
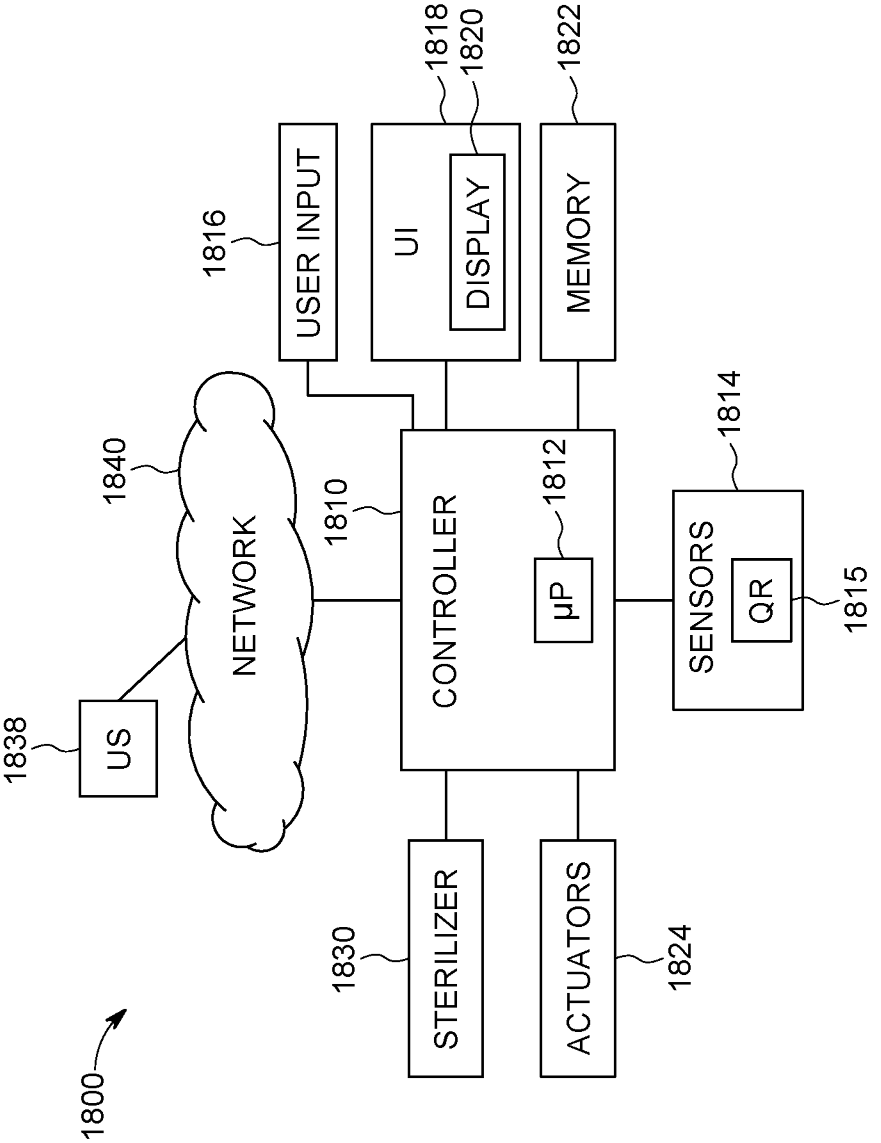
FIG. 18 shows an illustrative block diagram of a portion of a system in accordance with embodiments of the present system.

FIG. 18 shows an illustrative block diagram of a portion of a system 1800 in accordance with embodiments of the present system. The system 1800 may include one or more of: a controller 1810, one or more sensors 1814, a user interface (UI) 1818, a memory 1822, actuators 1824, a sterilizer 1830, a network 1840, and an optional user station (US) 1838 each of which may be coupled to and/or communicate with each other using any communication method or methods such as wired and/or wireless communication methods. The system 1800 may be operative under the control of the controller 1810.

The US 1838 may include any suitable user station such as a smart phone or the like that may be configured to communicate with other portions of the system 1800 such as the controller 1810 via any suitable communication method or methods such as via the network 1840. The controller 1810 may include one or more logic devices such as a microprocessor (μP) 1812 and may control the overall operation of the system 1800. It is appreciated that in some embodiments the controller 1810 may include digital and/or analog control circuitry.

It is envisioned that one or more portions of the system 1800 such as the controller 1810 may be operationally coupled to the memory 1822, the user interface (UI) 1818 including a rendering device such as the display 1820, the sensors 1814, the actuators 1824, the sterilizer 1830, the network 1840, and the US 1838.

The memory 1822 may be any type of device for storing application data as well as other data related to the described operation such as application data, operating parameters, etc. The application data, operating parameters, etc., may be received by the controller 1810 for configuring (e.g., programming) the controller 1810 to perform operation acts in accordance with the present system. The controller 1810 so configured becomes a special purpose machine particularly suited for performing in accordance with embodiments of the present system.

The controller 1810 may render content, such as still or video information, on a rendering device of the system such as on the display 1820 of the UI 1818. This information may include information related to operating parameters, instructions, feedback, and/or other information related to an operation of the system or portions thereof.

The sensors 1814 may be situated at one or more portions of the system and may sense related parameters, form corresponding sensor information, and provide this sensor information to the controller 1810 for further processing. For example, the sensors 1814 may include sensors such as optical sensors (e.g., a QR reader 1815, etc.), speed sensors, location sensors, rotational sensors, temperature sensors (e.g., for sealing, coupling, etc.) which may form corresponding sensor information (e.g., temperature, etc.) and provide this information to the controller 1810 for further analysis. The sensors 1814 may distributed throughout the system. Once the controller receives the sensor information (e.g., PACKAGE ID), the controller 1810 may obtain corresponding information from the memory (e.g., corresponding recipe information) and provide this information to a UI 1818 for rendering. Accordingly, instructions for the proper suggested use of the package and contents may be easily and readily conveyed to a user.

The UI 1818 may include a keyboard, a mouse, a trackball, or other device, such as a touch-sensitive display, which may be stand alone or part of a system, such as part of a laptop, a personal digital assistant (PDA), a mobile phone (e.g., a smart phone), a smart watch, an e-reader, a monitor, a smart or dumb terminal or other device for communicating with the controller 1810 via any operable link such as a wired and/or wireless communication link. The UI 1818 may be operable for interacting with the controller 1810 including enabling interaction with the UI 1818 as described herein. Clearly the controller 1810, the sensors 1814, the UI 1818, the memory 1822, the actuators 1824, the sterilizer 1830, the network 1840, and the optional user station (US) 1838 may all or partly be a portion of a computer system or other device. The UI 1818 may be operative to provide audio/visual feedback to the user of the present system and may inform the operator of operating parameters, operating states, etc.

The methods of the present system are particularly suited to be carried out by a computer software program, such program containing modules corresponding to one or more of: the individual steps or acts described and/or envisioned by the present system. Such program may of course be embodied in a computer-readable medium, such as an integrated chip, a peripheral device or memory, such as the memory 1824 or other memory coupled to the controller 1810.

The program and/or program portions contained in the memory 1822 may configure the controller 1810 to implement the methods, operational acts, and functions disclosed herein. The memories may be distributed, for example between the clients and/or servers, or local, and the controller 1810, where additional processors may be provided, may also be distributed or may be singular. The memories may be implemented as electrical, magnetic or optical memory, or any combination of these or other types of storage devices. Moreover, the term “memory” should be construed broadly enough to encompass any information able to be read from or written to an address in an addressable space accessible by the μP 1812 of the controller 1810. With this definition, information accessible through a network such as the network 1840 is still within the memory, for instance, because the processor 1812 may retrieve the information from the network 1840 for operation in accordance with embodiments of the present system.

The controller 1810 is operable for providing control signals and/or performing operations in response to input signals from the user UI 1818 as well as in response to other devices of a network, such as the sensors 1814 and executing instructions stored in the memory 1822. The μP 1812 may include one or more of: a microprocessor, an application-specific and/or general-use integrated circuit(s), a logic device, etc. Further, the μP 1812 may be a dedicated processor for performing in accordance with the present system and/or may be a general-purpose processor wherein only one of many functions operates for performing in accordance with the present system. The μP 1812 may operate utilizing a program portion, multiple program segments, and/or may be a hardware device utilizing a dedicated or multi-purpose integrated circuit.

The actuators 1824 may, under control of the controller 1810, control one or more valves, pumps, motors, gates, heaters, etc., of the system under the control of the controller 1810. For example, the actuators 1824 may include one or more heaters, microwave sealers, thermal sealers, and/or the like which may be operational to couple and/or seal portions of a package formed in accordance with embodiments of the present system. The actuators 1824 may further control one or more motors (e.g., linear, rotational, etc.) which may be operational to print, cut, fold, stamp, emboss, fill, and/or seal one or more portions of a package formed in accordance with embodiments of the present system. The sterilizer 1830 may be operative to sterilize portions of one or more packages formed in accordance with embodiments of the present system. In some embodiments, the sterilizer 1830 may include one or more valves, fans, pumps, radiation sources such as an illumination source for providing germicidal illumination (e.g., UV-C light) in accordance with embodiments of the present system. This germicidal illumination may sterilize packages formed and the packages content formed in accordance with embodiments of the present system. As readily appreciated, in accordance with embodiments the package/kit and the elements contained therein may be prepared in a sterile environment and thereby, may not require a further sterilization process.

Accordingly, embodiments of the present system may provide a low-cost system and method for forming, filling, and/or using a package for mixing ingredients in accordance with embodiments of the present system. Further variations of the present system would readily occur to a person of ordinary skill in the art and are encompassed by the following claims.

Finally, the above discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art including using features that are described with regard to a given embodiment with other envisioned embodiments without departing from the broader and intended spirit and scope of the present system as set forth in the claims that follow. In addition, any section headings included herein are intended to facilitate a review but are not intended to limit the scope of the present system. In addition, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices, features and/or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of preparing a dough using a kit, comprising:

providing the kit comprising:

a substrate comprising at least first and second surfaces situated between opposing ends and opposing edges, a re-closable closure coupled to the substrate and extending at least partially between the opposing edges, the substrate being folded at first, second and third folds and being coupled to itself at the opposing edges so as to define a gusset situated between the first and third folds, and to define a flexible container having at least a portion of a cavity configured to receive ingredients for making the dough, the cavity being filled with at least the ingredients, and having a support cavity at one or more of the first, second and third folds, the support cavity being configured to be grasped by a user, wherein the second surface further comprises a low adhesion surface coating configured to prevent adhesion of the dough;

opening the flexible container;

removing the ingredients;

placing at least a first portion of the ingredients back into the flexible container along with at least one additional ingredient;

closing the re-closable closure while removing a majority of air within the cavity;

manually manipulating the flexible container to mix the portion of the ingredients and the at least one additional ingredient together to form first mixed ingredients;

opening the re-closable closure;

placing at least one of a second portion of the ingredients and at least a second additional ingredient into the flexible container along with the first mixed ingredients back into the flexible container;

reclosing the re-closable closure while maintaining more air within the cavity then when the air was removed previously;

manually manipulating the flexible container to mix the first mixed ingredients and the at least one of the second portion of the ingredients and at least the second additional ingredient together to form second mixed ingredients;

reopening the re-closable closure; and removing the second mixed ingredients for baking and/or consumption.

2. The method of preparing the dough of claim 1, further comprising:

scanning a QR code on the flexible container;

retrieving instructions relating to at least one of preparation and mixing the ingredients of the kit to form the dough based on the scanned QR code; and rendering the instructions on a rendering device.

3. The method of preparing the dough of claim 1, wherein the flexible container further comprises one or more accessory items in the cavity which are separately packaged.

4. The method of preparing the dough of claim 3, wherein the removing further includes removing the one or more accessory items from the cavity.

5. The method of preparing the dough of claim 3, wherein the one or more accessory items includes at least one of craft sticks, gloves, measuring spoons, cups, bags, and parchment paper.

6. The method of preparing the dough of claim 4, further comprising measuring the ingredients with the one or more accessory items before the placing.

7. The method of preparing the dough of claim 1, wherein the ingredients are separately packaged and labeled with one or more markings to indicate an amount of an ingredient contained therein and/or indicate an order to add the ingredients back into the package.

8. The method of claim 1, wherein manually manipulating the flexible container comprises grasping the support cavity by at least one of an opening, a loop formed by a support strap, or a loop formed by coupling portions of the substrate at the first and third folds.

9. The method of claim 1, wherein the opening of the flexible container comprises separating the substrate along a weakened area extending between opposing edges.

10. The method of claim 1, wherein opening the flexible container comprises separating bonded tabs situated on opposing sides of the gusset.

* * * * *